United States Patent
Morgenstern et al.

(10) Patent No.: US 10,293,662 B2
(45) Date of Patent: May 21, 2019

(54) VEHICLE HAVING A REFRIGERANT CIRCUIT

(71) Applicant: Bayerische Motoren Werke Aktiengesellschaft, Munich (DE)

(72) Inventors: Stefan Morgenstern, Munich (DE); Robert Herbolzheimer, Groebenzell (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 87 days.

(21) Appl. No.: 15/271,435

(22) Filed: Sep. 21, 2016

(65) Prior Publication Data

US 2017/0008376 A1    Jan. 12, 2017

Related U.S. Application Data

(63) Continuation of application No. PCT/EP2015/055865, filed on Mar. 20, 2015.

(30) Foreign Application Priority Data

Apr. 3, 2014    (DE) .................. 10 2014 206 392

(51) Int. Cl.
*B60H 1/00* (2006.01)
*B60H 1/32* (2006.01)

(52) U.S. Cl.
CPC ....... *B60H 1/3225* (2013.01); *B60H 1/00207* (2013.01); *B60H 1/00585* (2013.01); *B60H 1/00978* (2013.01); *B60H 2001/00214* (2013.01); *B60H 2001/3291* (2013.01)

(58) Field of Classification Search
CPC ............. B60H 1/3225; B60H 1/00207; F25B 2345/001; F25B 2400/054; F25B 2400/051; F25B 2600/0271
See application file for complete search history.

(56) References Cited

U.S. PATENT DOCUMENTS

| | | | |
|---|---|---|---|
| 5,660,051 A | 8/1997 | Sakakibara et al. | |
| 5,983,657 A | 11/1999 | Murata et al. | |
| 6,837,061 B2 * | 1/2005 | Kadle | B60H 1/00485 62/149 |

(Continued)

FOREIGN PATENT DOCUMENTS

| | | |
|---|---|---|
| CN | 1572555 A | 2/2005 |
| CN | 102205790 A | 10/2011 |

(Continued)

OTHER PUBLICATIONS

International Search Report (PCT/ISA/210) issued in PCT Application No. PCT/EP2015/055865 dated Jun. 23, 2015 with English translation (Six (6) pages).

(Continued)

*Primary Examiner* — Cassey D Bauer
(74) *Attorney, Agent, or Firm* — Crowell & Moring LLP

(57) ABSTRACT

A vehicle has a drive motor and a refrigerant circuit. The refrigerant circuit includes, when viewed in the direction of flow of the refrigerant, a compressor, a gas cooler or condenser, an expansion device and an evaporator. The refrigerant circuit has a first shut-off element which is arranged outside of an area arranged between the drive motor and the evaporator.

15 Claims, 2 Drawing Sheets

(56) References Cited

U.S. PATENT DOCUMENTS

| | | | |
|---|---|---|---|
| 7,111,472 B1* | 9/2006 | Cloud | F25B 40/00 |
| | | | 62/278 |
| 2004/0237558 A1 | 12/2004 | Komatsu | |
| 2005/0076950 A1 | 4/2005 | Berbuer | |
| 2005/0217313 A1* | 10/2005 | Tsugawa | B60H 1/3225 |
| | | | 62/527 |
| 2006/0080989 A1* | 4/2006 | Aoki | F25B 13/00 |
| | | | 62/324.4 |
| 2007/0101747 A1 | 5/2007 | Eisenhour | |
| 2008/0289353 A1 | 11/2008 | Maruya et al. | |
| 2011/0241378 A1 | 10/2011 | Steller | |

FOREIGN PATENT DOCUMENTS

| | | |
|---|---|---|
| DE | 198 03 196 A1 | 8/1998 |
| DE | 696 30 665 T2 | 9/2004 |
| DE | 103 37 370 A1 | 3/2005 |
| DE | 10 2004 019 929 A1 | 12/2005 |
| DE | 10 2005 007 687 A1 | 8/2006 |
| DE | 10 2006 053 674 A1 | 5/2008 |
| EP | 0 788 909 A2 | 8/1997 |
| EP | 1 114 742 A2 | 7/2001 |
| EP | 1 435 494 B1 | 7/2004 |
| EP | 1 584 506 A1 | 10/2005 |
| JP | 2006-142989 A | 6/2006 |

OTHER PUBLICATIONS

German-language Written Opinion (PCT/ISA/237) issued in PCT Application No. PCT/EP2015/055865 dated Jun. 23, 2015 (Five (5) pages).

German-language Office Action issued in counterpart German Application No. 10 2014 206 392.2 dated Mar. 11, 2015 (Four (4) pages).

Chinese-language Office Action issued in counterpart Chinese Application No. 201580004289.7 dated Jun. 29, 2017 with English translation (Seventeen (17) pages).

Chinese Office Action issued in Chinese counterpart application No. 201580004289.7 dated Mar. 14, 2018; with partial English translation (Five (5) pages).

* cited by examiner

VEHICLE HAVING A REFRIGERANT CIRCUIT

CROSS REFERENCE TO RELATED APPLICATIONS

This application is a continuation of PCT International Application No. PCT/EP2015/055865, filed Mar. 20, 2015, which claims priority under 35 U.S.C. § 119 from German Patent Application No. 10 2014 206 392.2, filed Apr. 3, 2014, the entire disclosures of which are herein expressly incorporated by reference.

BACKGROUND AND SUMMARY OF THE INVENTION

The present invention relates to a vehicle with a drive motor and a refrigeration circuit.

Vehicle air conditioning units are always designed with "crash safety" in mind. One aspect to be taken into account is that, in the case of a crash where refrigerant lines or individual components of the refrigerant circuit are damaged, no or as little as possible refrigerant should escape into the passenger compartment.

The object of the invention is to create a vehicle with a refrigerant circuit of relatively high safety with respect to the safety aspects described above.

This and other objects are achieved by a vehicle with a drive motor and a refrigeration circuit. The refrigerant circuit, when viewed in a refrigerant flow direction, has a compressor, a gas cooler or condenser, an expansion device and an evaporator, wherein the refrigerant circuit has a first shutoff element arranged outside of an area that is located between the drive motor and the evaporator.

The starting point of the invention is a vehicle with a drive motor and a refrigerant circuit. The drive motor can be disposed in an engine compartment in front of a passenger cell (vehicle with front engine). Alternately, the drive motor could also be arranged in an engine compartment behind the passenger compartment (vehicle with rear engine).

When viewed in the direction of flow of the refrigerant, the refrigerant circuit has a compressor, a gas cooler, an expansion device and an evaporator.

An aspect of the invention is that the refrigerant circuit has a first shutoff element, which closes in case of a crash of the vehicle if the refrigerant circuit is damaged (such as, for example, a tear in a refrigerant line, destruction of a component of the refrigerant circuit, or the like). In accordance with the invention, the first shutoff element is arranged in an area of the vehicle where the probability of the first shutoff element being damaged in a crash and becoming inoperative is relatively low. In accordance with the invention, the first shutoff element is arranged outside of an area located between the drive motor and the evaporator.

In a vehicle with a front engine, the evaporator—when viewed in the driving direction of the vehicle—is arranged behind the drive motor. The evaporator—when viewed in the driving direction of the vehicle—is commonly arranged behind a firewall that separates the passenger compartment and the engine compartment of the vehicle. The evaporator is commonly disposed in a so-called air conditioning device which, in a vehicle with rear drive, is arranged in the area of the center tunnel above the transmission bell housing.

In the event that the evaporator or a refrigerant line located in the passenger compartment becomes damaged in a crash, the first shutoff element closes and limits the amount of refrigerant flowing out through the leak and/or the damaged evaporator into the passenger compartment.

As already indicated above, in accordance with the invention, a "forbidden area" is defined, which could also be called a "critical area." The term "forbidden area" is understood to be an area into which the drive motor could be pushed in case of a more severe crash of the vehicle.

In accordance with the invention, the first shutoff element, which is to limit the escaping amount of refrigerant in case of damage to the refrigerant circuit, is arranged outside of the "forbidden area", which is to say in an area that is particularly crash-safe, which is to say in an area where the probability that the first shutoff element would be damaged in its function during a crash of the vehicle is relatively low.

According to an aspect of the invention, the first shutoff element is a check valve that allows the refrigerant to pass through in the common direction of flow of the refrigerant circuit, and shuts off in the opposite direction.

According to another aspect of the invention, the refrigerant circuit has a so-called low pressure filling connector, which when viewed in the direction of flow of the refrigerant is arranged after (downstream of) the first shutoff element. By definition, the low pressure filling connector is arranged on a low-pressure side relative to the expansion device of the refrigerant circuit.

According to a further aspect of the invention, the refrigerant circuit has an accumulator or collector which, when viewed in the direction of flow of the refrigerant, is arranged downstream of the first shutoff element and which, in particular, when viewed in the direction of flow of the refrigerant, is arranged downstream of the low pressure filling connector. Therefore, the task of the first shutoff element is in particular to prevent a back or outflow of refrigerant from the accumulator or collector in the direction of the expansion device if the refrigerant circuit is damaged.

Safety can be improved further with respect to limiting the amount of outflowing refrigerant if a second shutoff element is provided. According to an aspect of the invention, the second shutoff element—when viewed in the direction of flow of the refrigerant—is disposed upstream of the evaporator. In case of a crash where the refrigerant circuit is damaged, the second shutoff element limits or prevents refrigerant from flowing from the high-pressure side of the refrigerant circuit in the direction of the evaporator.

With respect to safety aspects, the second shutoff element is also arranged outside of the "forbidden area", which is to say, outside of the area between the drive motor and the evaporator.

Preferably, the "forbidden area" includes more than merely the area directly between the combustion motor and the evaporator. For example, it may be provided that the "forbidden area" defines a "projection of the drive motor" in a direction opposite to the driving direction of the vehicle (for a vehicle with front engine) or a projection of the drive motor in the driving direction of the vehicle (for a vehicle with rear engine), wherein the first, as well as the optionally provided second, shutoff element is arranged outside of the potential crash area defined by the projection of the drive motor.

If one wants to improve safety even further, the potential crash area or the forbidden area can be defined even broader. For example, it may be provided that, when viewed in top view of the vehicle, the forbidden area additionally includes a left area, which with a longitudinal direction of the vehicle includes a specified angle, and/or a right area, which with a longitudinal direction of the vehicle includes a specified angle, with the first as well as the optionally provided second shutoff element being arranged outside of the additional left and/or right area. The specified angle may be 45°, for example.

The second shutoff element may take the form of an expansion device that is capable of being shut off, which is to say, the expansion device of the refrigerant circuit can be developed as an expansion device capable of being shut off. Alternately, the second shutoff element may be separate from the expansion device and may be, for example, arranged in particular directly upstream or downstream and/or in particularly directly downstream of the expansion device.

According to an aspect of the invention, the second shutoff element can be electrically triggered, wherein it can be provided that it is open when an electrical voltage is applied to the second shutoff element, or that it is closed if the voltage drops below a specified voltage or if no voltage is applied to the second shutoff element. A second shutoff element designed in this way is failure-proof, which is to say, it shuts off if the electrical voltage drops below a specified voltage. The closing of the second shutoff element can be effected, for example, by a mechanical spring integrated in the second shutoff element.

According to another aspect of the invention, the refrigerant circuit has a high pressure filling connector which, when viewed in the direction of flow of the refrigerant, is arranged downstream of the gas cooler. If the refrigerant circuit has a low pressure filling connector as well as a high pressure filling connector, the refrigerant circuit can be evacuated and filled with refrigerant very well during filling of the refrigerant circuit.

Furthermore, a so-called internal heat exchanger may be provided. A first section of the refrigerant circuit located between the high pressure filling connector and the expansion device may be coupled thermally to a second section of the refrigerant circuit located between the accumulator and the compressor.

With a vehicle having a front engine, the gas cooler, when viewed in the driving direction of the vehicle, may be arranged in front of the drive motor in an engine compartment of the vehicle.

The firewall already mentioned above, which separates the passenger compartment from the engine compartment, preferably has a passage through which a supply line and a return line of the refrigerant circuit runs.

As already mentioned, the first and the optionally provided second shutoff element are arranged outside of the so-called forbidden area. The first and/or the second shutoff element can be, in particular, arranged in a lateral area next to the drive motor.

The invention is particularly suited for so-called $CO_2$ air condition units, which is to say for vehicles with refrigerant circuits through which carbon dioxide flows.

In summary, the invention achieves the following advantages:
  The "safety function" of reducing the amount of refrigerant that potentially flows out into the passenger compartment during a crash of the vehicle is ensured even in the event of more severe damage to the vehicle and/or the refrigerant circuit,
  The danger of a potentially critical "refrigerant-air-mixture" being created is limited.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
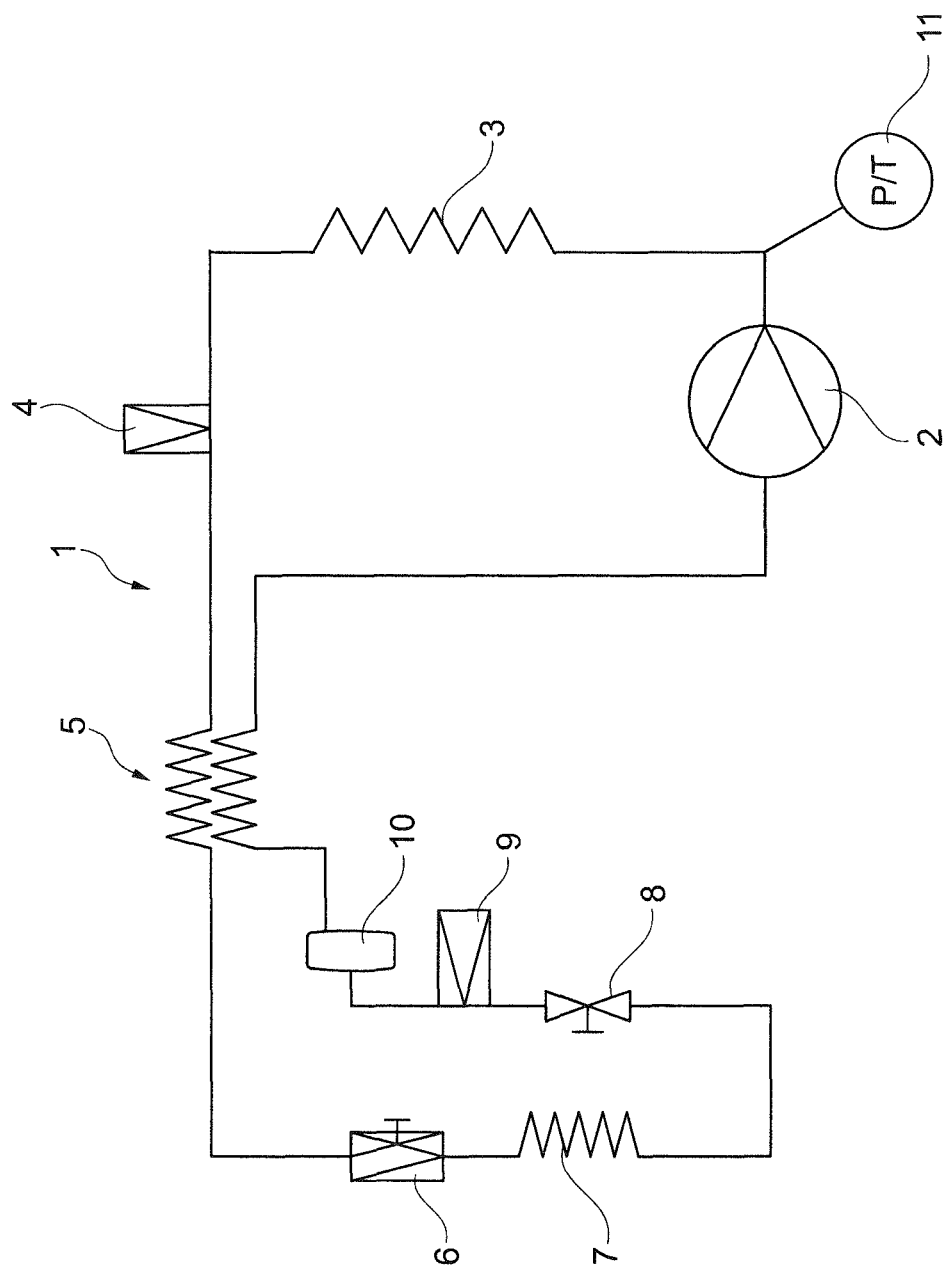
FIG. 1 schematically illustrates a refrigerant circuit in accordance with an embodiment of the invention.

FIG. 1 shows a refrigerant circuit 1 of a vehicle air conditioning unit. When viewed in the refrigerant flow direction, the refrigerant circuit 1 has a refrigerant compressor (called "compressor" in the following) 2, a gas cooler or condenser 3, a high pressure filling connector 4, an internal heat exchanger 5, an expansion device 6 that is capable of being shut off, an evaporator 7, a shutoff element 8, a low pressure filling connector 9, and an accumulator and/or collector 10.

Instead of the expansion device 6, which is capable of being shut off, it is also possible to provide a combination of a shutoff valve and an expansion device (which is not capable of being shutoff).

The shutoff element 8 can be a check valve, for example, which allows refrigerant to pass through from the evaporator 7 in the direction of the low pressure filling connector 9, and which shuts off in reverse direction of flow.

Furthermore, a pressure sensor and a temperature sensor or a combined pressure-/temperature sensor (P/T) 11 may be provided. The sensor 11 can be arranged, for example, between the high pressure side of the compressor 2 and the gas cooler or condenser 3 to measure the pressure and/or the temperature of the refrigerant.

As shown in FIG. 1, a first section of the refrigerant circuit 1, which is located between the high pressure filling connector 4 and the expansion device 6, which is capable of being shut off, is thermally coupled via the internal heat exchanger 5 to a lateral section of the refrigerant circuit 1, which is located between the accumulator 10 and the compressor 2.

Figure 2:
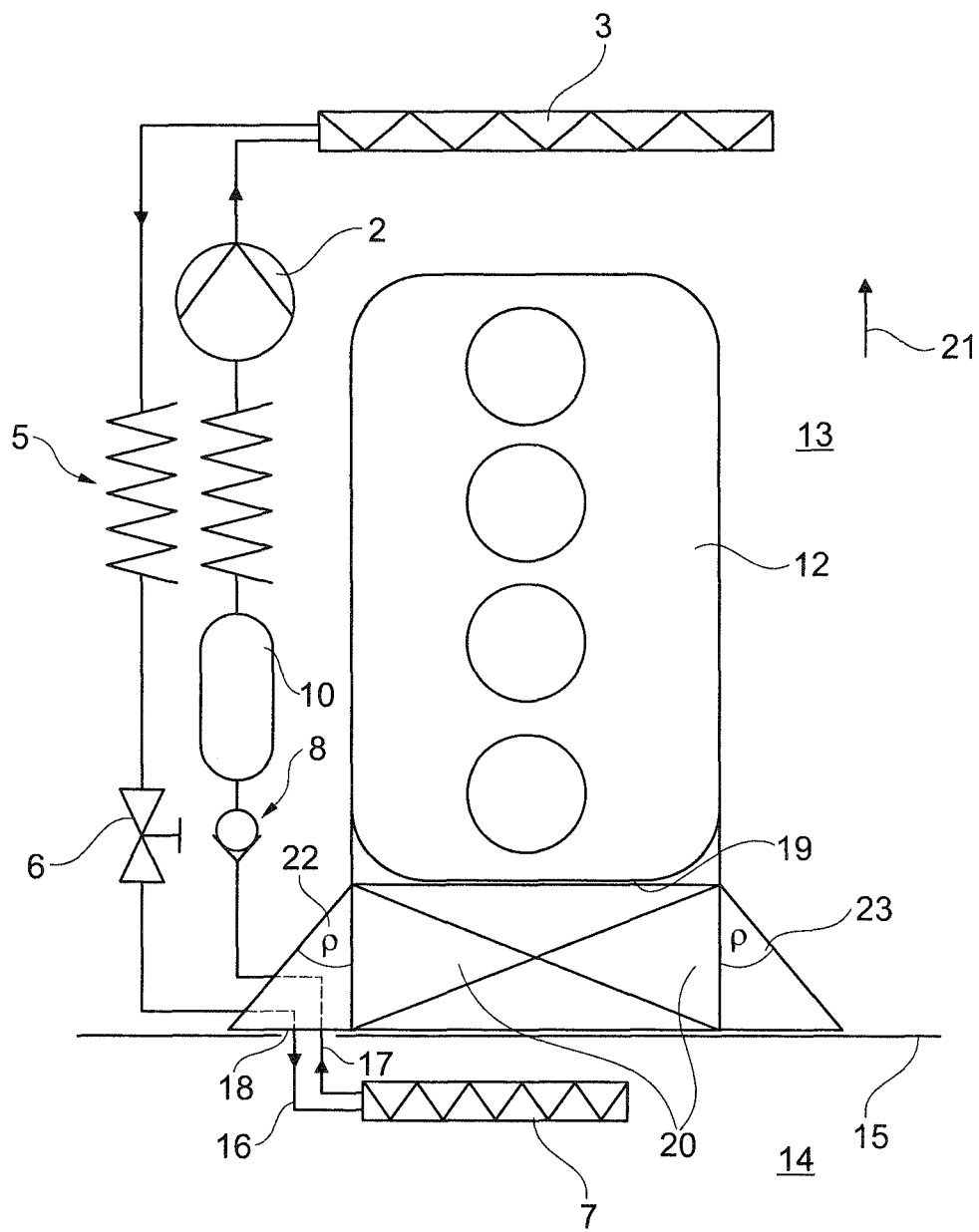
FIG. 2 schematically illustrates an exemplary arrangement of the most important components of a refrigerant circuit in accordance with the invention with respect to a forbidden area located between the drive motor and the evaporator.

FIG. 2 describes an advantageous arrangement of the essential components of the refrigerant circuit shown in FIG. 1 in a vehicle. The vehicle (which is not shown here in detail) has a drive motor 12, which may be a combustion motor, for example. The drive motor 12 is arranged in an engine compartment 13 of the vehicle. The engine compartment 13 is structurally separated from a passenger compartment 14 of the vehicle by a so-called firewall 15.

As shown in FIG. 2, the evaporator 7 is arranged in the center area of the vehicle at the side of the front wall 15 that faces the passenger compartment 14. The evaporator 7 may be integrated into an air conditioning unit that is not shown here in detail. In a front-driven vehicle with a front engine, the air conditioning unit can be arranged above the transmission bell housing (not shown) that connects to the rear side of the drive motor.

As shown in FIG. 2, the first shutoff element (check valve) 8, the collector and/or accumulator 10, the internal heat exchanger 5, the compressor 2 and the second shutoff element, which is formed here by an expansion device 6 that is capable of being shut off, are arranged laterally next to the drive motor 12. A flow line 16 and a return line 17 of the refrigerant circuit run from the engine compartment 13 through a passage opening 18 provided in the firewall 15.

FIG. 2 shows a top view of the vehicle. A center area 20 located between a rear side 19 of the drive motor 12 and the evaporator 7 forms part of a so-called "forbidden area." The center area 20 is defined by a projection of the drive motor 12 in an opposite direction to the direction of travel 21 of the vehicle.

The forbidden area furthermore includes an additional left area 22 and a right area 23. The left and right areas 22, 23 respectively include an angle p with a longitudinal direction of the vehicle, which is to say, the left and/or right area 22 and/or 23 protrude laterally from the longitudinal direction of the vehicle.

The angle p of the left and/or right area can be, for example, 45°, 40°, 35°, 25°, 20°, 15° or 10°.

The left area 22, the right area 23 and the center area 20 taken together define the already mentioned "forbidden area". This area is called the "forbidden area" because in a severe crash of the vehicle, the drive motor 12 may be pushed into the area. Components located in that area therefore may be damaged in a severe crash of the vehicle.

As already mentioned, the two shutoff elements 6, 8 are of central importance as regards the escape of refrigerant into the passenger compartment 14. Accordingly, the shutoff elements 6, 8 are arranged outside of the forbidden or critical area that is formed by the areas 22, 23 and 20.

In the embodiment shown in FIG. 2, the shutoff elements 6, 8 are arranged laterally next to a rear area of the drive motor 12. In this area, the probability of the shutoff elements 6, 8 being damaged in a crash of the vehicle is very low. If the refrigerant circuit 1 is damaged in the crash of the vehicle, both shutoff elements 6, 8 will shut off and therefore limit the amount of refrigerant that can flow out of the refrigerant circuit in the direction of the passenger compartment 14. The check valve 8 in particular prevents refrigerant from the accumulator or collector 10 flowing back in the direction of the evaporator 7 or passenger compartment 14. The expansion device 6, which is capable of being shut off and closes in a crash, prevents refrigerant from flowing from the high pressure side of the compressor 2 and/or from the gas cooler 3 in the direction of the evaporator 7 and/or the passenger compartment 14.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a drive motor, the vehicle comprising:
   a refrigerant circuit which, viewed in a refrigerant flow direction, comprises a compressor, a gas cooler or condenser, an expansion device, an evaporator, and an accumulator arranged between the evaporator and the compressor, wherein
   the refrigerant circuit further comprises a first shutoff element and a second shutoff element, wherein each shutoff element is arranged laterally next to a rear area of the drive motor, and each shutoff element is arranged outside of an area located between the drive motor and the evaporator, wherein the first shutoff element is arranged between the accumulator and the evaporator and the second shutoff element is arranged between the condenser and the evaporator;
   a projection of the drive motor in a longitudinal direction of the vehicle defines a potential crash area and wherein the first and the second shutoff elements are arranged outside of the defined potential crash area;
   the potential crash area viewed in a top view from above the vehicle, further comprises a left area which includes an angle of 45° with respect to the longitudinal direction of the vehicle and wherein the first and the second shutoff elements are arranged outside of the additional left area.

2. The vehicle according to claim 1, wherein the first shutoff element comprises a check valve, the check valve allowing refrigerant to flow through the check valve in the refrigerant flow direction and shutting off flow in an opposite direction from the accumulator.

3. The vehicle according to claim 1, wherein the refrigerant circuit further comprises a low pressure filling connector which, viewed in the refrigerant flow direction, is arranged downstream of the first shutoff element.

4. The vehicle according to claim 3, wherein the accumulator, viewed in the refrigerant flow direction, is arranged downstream of the low pressure filling connector.

5. The vehicle according to claim 1, the potential crash area, viewed in a top view from above the vehicle, further comprises a right area which includes an angle of 45° with respect to the longitudinal direction of the vehicle, and
   the first and the second shutoff elements are arranged outside of the additional right area.

6. The vehicle according to claim 1, wherein the second shutoff element is the expansion device, the expansion device being configured to be shut off.

7. The vehicle according to claim 1, wherein the second shutoff element is configured to be triggered electrically.

8. The vehicle according to claim 7, wherein the second shutoff element is open in a state when electrical energy is applied and closed in a state when no electrical energy is applied.

9. The vehicle according to claim 1, wherein the refrigerant circuit further comprises a high pressure filling connector which, viewed in the refrigerant flow direction, is arranged downstream of the gas cooler or condenser.

10. The vehicle according to claim 9, wherein a first section of the refrigerant circuit located between the high pressure filling connector and the expansion device is thermally coupled via an internal heat exchanger to a second section of the refrigerant circuit located between the accumulator and the compressor.

11. The vehicle according to claim 1, wherein:
    the vehicle is a front engine vehicle,
    the gas cooler or condenser is arranged in a direction of travel of the vehicle in front of the drive motor in an engine compartment of the vehicle.

12. The vehicle according to claim 11, wherein:
    the evaporator is arranged in a passenger compartment of the vehicle, and
    the passenger compartment is located behind the drive motor and is separated from the engine compartment via a firewall.

13. The vehicle according to claim 12, wherein the firewall comprises a passage through which a flow line and a return line of the refrigerant circuit pass.

14. The vehicle according to claim 1, wherein the refrigerant circuit is a $CO_2$ refrigerant circuit.

15. The vehicle according to claim 1, wherein a pressure and/or temperature sensor is arranged between the compressor and the gas cooler or condenser.

* * * * *